(12) United States Patent
Colon et al.

(10) Patent No.: US 12,149,549 B1
(45) Date of Patent: Nov. 19, 2024

(54) PEER-BASED INFERENCE OF UNUSED IDENTITY AND ACCESS MANAGEMENT RIGHTS

(71) Applicant: Amazon Technologies, Inc., Seattle, WA (US)

(72) Inventors: Brendan Cruz Colon, Seattle, WA (US); Matthew Michael Sommer, Issaquah, WA (US); Alexander Noble Adkins, Catlettsburg, KY (US); Christopher Miller, Seattle, WA (US); Kimberly A. Young, Woodinville, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 384 days.

(21) Appl. No.: 17/527,808

(22) Filed: Nov. 16, 2021

(51) Int. Cl.
*H04L 41/142* (2022.01)
*H04L 9/40* (2022.01)

(52) U.S. Cl.
CPC ........ *H04L 63/1425* (2013.01); *H04L 41/142* (2013.01); *H04L 63/102* (2013.01); *H04L 63/104* (2013.01)

(58) Field of Classification Search
CPC . H04L 63/1425; H04L 63/102; H04L 63/104; H04L 41/12
See application file for complete search history.

(56) References Cited

U.S. PATENT DOCUMENTS

| | | | |
|---|---|---|---|
| 8,214,398 B1* | 7/2012 | Cowan | G06F 21/6218 707/787 |
| 9,106,687 B1* | 8/2015 | Sawhney | H04L 12/185 |
| 9,246,945 B2* | 1/2016 | Chari | H04L 63/20 |
| 9,401,925 B1* | 7/2016 | Guo | G06F 21/552 |
| 11,477,183 B1* | 10/2022 | Brandwine | H04L 63/0838 |
| 11,882,124 B1* | 1/2024 | Keating | G06F 16/80 |
| 2014/0215604 A1* | 7/2014 | Giblin | G06F 21/6218 726/21 |
| 2015/0261956 A1* | 9/2015 | Anderson | G06F 21/57 726/22 |
| 2017/0250885 A1* | 8/2017 | Donovan | H04L 43/16 |
| 2019/0034843 A1* | 1/2019 | Mehrotra | G06Q 10/0631 |
| 2020/0252405 A1* | 8/2020 | Sankavaram | G06F 21/62 |
| 2022/0078590 A1* | 3/2022 | Gundavelli | H04W 76/10 |
| 2023/0097770 A1* | 3/2023 | Dimitrova | H04L 63/1425 726/1 |
| 2024/0004527 A1* | 1/2024 | Lee | G06F 21/6227 |

* cited by examiner

*Primary Examiner* — Dhairya A Patel
(74) *Attorney, Agent, or Firm* — K&L Gates LLP

(57) ABSTRACT

Devices and techniques are generally described for unused identity and access management rights detection. In various examples, a first skill-usage vector associated with a first profile may be determined. A first nearest neighbor algorithm and the first skill-usage vector may be used to determine a second skill-usage vector grouped together with the first skill-usage vector in a feature space, where the second skill-usage vector is associated with a second profile. A first rights vector associated with the first profile may be determined. The first rights vector associated with the first profile may be compared to a second rights vector associated with the second profile. At least one unused right associated with the first profile may be determined based at least in part on the comparing of the first rights vector to the second rights vector.

20 Claims, 7 Drawing Sheets

PEER-BASED INFERENCE OF UNUSED IDENTITY AND ACCESS MANAGEMENT RIGHTS

BACKGROUND

The access privileges and other institutional rights of individuals within an organization often shift over time as roles and responsibilities of the individuals change. In large institutions, it can be difficult to keep track of individuals' rights as they change roles and/or responsibilities. In some cases, fraudulent actors may seek to exploit the difficulties in tracking such rights and/or privileges and may acquire and/or delegate such rights and/or privileges for fraudulent purposes.

DETAILED DESCRIPTION

Figure 1:
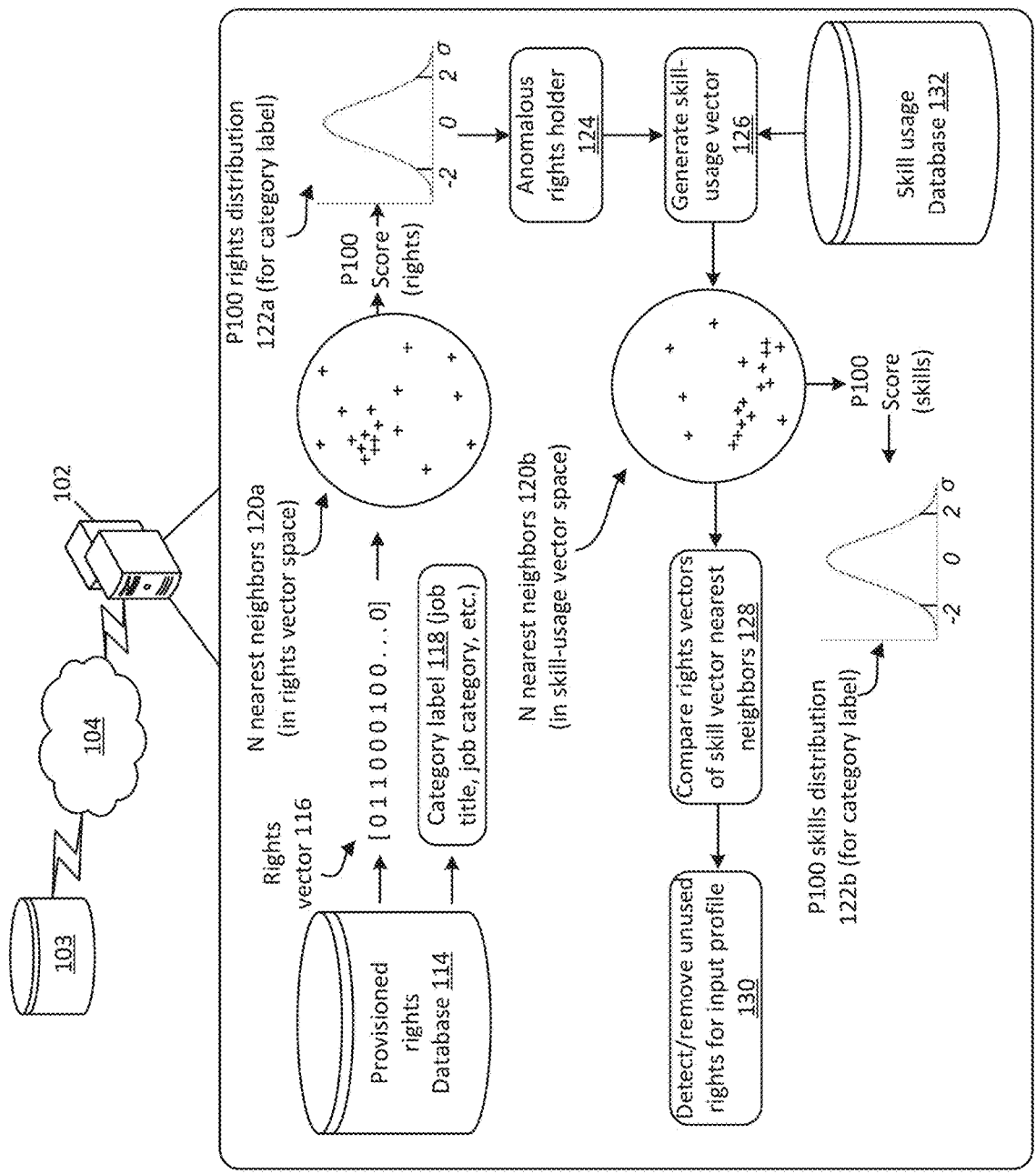
FIG. 1 is a block diagram illustrating a peer-based unused rights detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Large institutions and/or employers may acquire sensitive data (e.g., personally identifiable information (PII)) as part of their business practices. The need to protect such sensitive information and/or data may be balanced against providing some employees access to some of this sensitive information in order to provide the ability to assist customers and/or other users. For example, customer service associates may require access to customer account information in order to assist customers with account issues. However, access controls are provided to limit access to potentially sensitive information to only those individuals that require such sensitive information as part of their legitimate job functions. Access rights may be abused by bad actors to attempt to gain access to sensitive user data. For example, internal users (e.g., employees) may attempt to gain access to sensitive customer data in order to exfiltrate such data from secure servers to outside systems.

However, in large institutions, employees and/or systems may have different roles and responsibilities and may thus have different access rights relative to other employees, even among employees with the same job category and/or job title. Accordingly, it may be difficult to determine if an employee has acquired rights that are anomalous to that employee's job function simply by comparing that employees rights to a standard rights profile for their position. Described herein are various systems and techniques that may be used for anomaly detection. Specifically, systems and techniques are described to determine whether an individual has acquired anomalous rights (e.g., rights that the individual should not have or does not need) relative to their peers. In this context, "peers" refers to other individuals with similar job categories, job families, job titles, etc.

In an example, a customer service agent's profile (e.g., a user profile) may comprise a number of rights (e.g., a right to access a particular database, a right to send data from one system to another system, etc.). In the examples described herein, a skill is a tool that an agent may use to perform one or more actions. Skills may require one or more rights in order to perform granular permissive actions associated with the operation of the skill. For example, a skill may be called "user_account_change" and may permit an agent to change information in a user's account (e.g., user name, password, etc.) in order to assist other users. In order to be able to use the skill, the agent's profile may need one or more rights that enable the agent to perform the actions required by the skill. In the example, the "user_account_change" skill may require a first right enabling the agent to access a secure database. Further, the "user_account_change" skill may require a second right allowing the agent to modify values within the secure database. The foregoing example of skills and rights is merely one example. In general, skills are associated with actions that may be taken by an agent. Each skill may require a particular set of one or more rights in order to be able to carry out the action performed by the skill. The particular rights for each skill are dependent on the skill's implementation.

The principle of least privilege (PoLP) is where solely permissions required to complete a task are offered. The over-provisioning of rights can lead to customer impact in the forms of fraud and data exfiltration even when rights are not offered maliciously (e.g., when such rights are rolled-over from an agent's previous role). Enforcing PoLP is a balance between protecting users but potentially adding friction to agent workflow. A complication with identity and access management (IAM) rights is they are often numerous and their actual functions may not always be transparent. The various rights and/or skills described herein may be associated with individuals (e.g., employees) and/or with profiles and/or systems (e.g., computing systems). For example, some computing systems may be provisioned with certain rights allowing the systems to perform certain skills. Accordingly, the terms "individual," "subject," "agent," etc., used herein may refer to profiles representing individuals and/or to profiles representing compute systems.

Described herein are various systems and techniques that may be used to determine, for profile data representing an agent, unused rights even when the specific privilege or ability granted by the right is abstract. The various systems and techniques described herein leverages both the rights granted to a given profile, as well as subsequent skill-usage (e.g., activity on a web application) where the skill-usage is controlled by the particular rights associated with the agent profile data.

In various examples, each employee (or other individual associated with the relevant institution) may be associated with a rights array (e.g., a rights vector) that defines the rights of that employee. In various examples, each element of the rights vector (or array) may correspond to a particular right, while the value of each element may indicate whether or not the employee has the associated right. In an example implementation, the rights vector may comprise binary values with a 0 indicating that the employee does not have the associated right, and a 1 indicating that the employee has the associated right. However, other implementations (e.g., non-binary implementations) are possible in accordance with the desired use case. As used herein, "rights" refer to a permission and/or level of access that is enforced by a computer and/or a computer-system that permits or prohibits (depending on presence or absence of the right) a user from taking a defined computing action, operation, and/or access to a controlled area and/or controlled information. In various examples, individuals may be designated with "roles" that may include a specified set of rights. Accordingly, in at least some cases, a role may be associated with a particular rights vector that describes the particular rights associated with the role.

Similarly, skill-usage data (e.g., skill-usage vectors) may be determined for each employee (or other individual associated with the relevant institution). Skill-usage vectors may represent all skills available to the individuals and may represent, on a per-individual basis, whether the individual has used each skill (e.g., a binary skill-usage vector implementation) and/or how often the individual has used each skill over a given time period (e.g., a non-binary skill-usage vector implementation).

In various examples, there may be a large number of rights (e.g., hundreds, thousands, tens of thousands, etc.) at an organizational level. Additionally, large organizations may have a large number of employees making comparison of individuals' rights vectors a non-trivial task. In some examples described herein, for each employee, a nearest neighbor algorithm may be executed to determine the top N nearest neighbors for each employee in the rights space. For example, a nearest neighbor algorithm may be used to determine the 100 closest employees (N=100) in terms of rights held by the subject employee. In some cases, because of the large dimensionality and size of the data, an approximate nearest neighbor algorithm may be advantageous. For example, Approximate Nearest Neighbors Oh Yeah (AN-NOY) may be used to drastically reduce compute time. ANNOY subdivides n-dimensional space by inserting random hyperplanes through the data that subdivide the search space. Similarly, a nearest neighbor algorithm may be used for skill-usage vectors to determine the most similar individuals in terms of skill-usage over a given time period.

Upon determining the nearest neighbors in the rights space and/or skills space for a subject, a determination may be made of the number of the nearest neighbors that have the same pre-defined category or categories as the subject. In various examples, each job or position may be associated with various category descriptor labels. For example, the subject may have the category label "Customer Service Associate 2." A determination may be made of how many of the N nearest neighbors in the rights space and/or skills space are associated with the category label "Customer Service Associate 2." In various examples, where N=100 the number of the 100 nearest neighbors in the rights space having the matching predefined category label may be referred to as a P100 score. More generally, the number of the N nearest neighbors in the rights space and/or skills space having the matching predefined category label may be referred to as a "score" or "P score" for the subject. Generally, having a lower score indicates that the subject has an anomalous rights profile (or skill-usage profile) among other individuals associated with the same predefined category.

Upon determining the most similar individuals for a given subject in the skill-usage space, the rights vectors of these similar individuals may be determined. Comparing the rights vector of the subject to the rights vectors of the most similar individuals in the skill-usage space can provide an indication of unused rights. For example, if the subject has one or more rights that the most similar individuals in the skill-usage space do not also possess, it may indicate that the subject does not use these rights (and/or does not need these rights) as a part of their day-to-day workflow. Advantageously, this is possible even without investigating or understanding what abilities the particular rights convey. Since many rights are highly abstracted (enabling various compute-related operations) this can be an advantageous investigative and/or remedial tool. Identifying and/or removal of such unused identification and access management rights can help to prevent unauthorized activity, such as impermissible data exfiltration, access to sensitive data, access to secure systems, malware attacks, etc.

In many examples herein, the P scores are referred to as "P100 scores." Although, as previously described any value for N in the nearest neighbor algorithm (or approximate nearest neighbor algorithm) may be used. Accordingly, although often referred to as P100 scores, the score may reflect the number of matching category labels among a set of individuals of any size (output by the nearest neighbor algorithm). In various examples, a distribution of the P scores for each category label of interest may be determined and a Z-score may be computed for each individual.

A Z-score (sometimes referred to as a "standard score") is given by:

$$Z = \frac{x - \mu}{\sigma}$$

where x is the observed value (the P score of the individual), u is the mean score of the sample, and σ is the standard deviation of the sample. An individual with a Z-score above (or below) a certain threshold indicates that the individual has anomalous rights with respect to their peers. In various examples, Z-scores may be calculated for different regions and/or markets (e.g., North America, Asia, etc.). In various examples, other techniques may be used to determine that an individual has anomalous rights with respect to their peers. For example, a mean P score u of individuals having the same category label as the individual may be determined. A residual value may be determined for the individual being evaluated (e.g., x-u). The magnitude of the residual value may be used to determine whether the individual has anomalous rights and/or skill-usage with respect to their peers.

Because an individual can be anomalous because of a lack of rights and due to an over-abundance of anomalous rights (and, similarly, due to using more than or less than the typical skills associated with the individual's category), a representative "segment vector" may be calculated to pull out over-provisioned users and determine which rights and/ or skills are particularly anomalous. For example, for each category label (e.g., job family, job title, department, and/or any other desired category descriptor) a representative segment vector of rights (or skill-usage) may be determined. The segment vector may be a rights vector (or skill-usage vector) that takes the average of all values of all individuals having the relevant category label (e.g., an average vector for all rights values for the category label). In the case where the rights vectors are binary, the segment vector will have values between 0-1. Accordingly, the segment vector measures the relative propensity of each category to have or not have each right. Each employee's right vector may be subtracted from the segment vector and rights with less than a 1/10 chance of appearing given the employee category may be flagged for potential investigation. For example, the segment vector may be used to determine that less than a threshold percentage of individuals with a relevant category label have a particular right. Although in the example above a rights vector is described, the same techniques may be used for skill-usage vectors.

As different rights may be provisioned over time and different skills may be used over time, the various techniques described herein may be repeated over time (e.g., on a daily basis, weekly basis, etc.) to capture longitudinal anomalies from sudden over-provisioning of rights alongside over-provisioning stemming from a past event (e.g., where an employee changes job titles/responsibilities and acquires new rights stemming from the change while keeping rights from the previous role).

The various systems and techniques described herein may be used in a variety of applications. For example, the techniques may be used to generate a baseline "standard" permission structures for job types. This may be particularly useful for cases where a large body of employees have potential access to sensitive data. The P score (e.g., P100) metric is inherently robust to perturbation (from organizational changes, policy changes, job requirement changes, etc.) as it detects anomalies relative to other peers rather than a hard-coded standard. Additionally, when an individual has acquired anomalous rights, it can be determined which job category that individual most closely resembles (based on their rights) from their nearest neighbors (e.g., similar rights holders, such as rights holders having one or more common rights to the individual being evaluated). For example, the predominant category label (e.g., the category label associated with the most individuals among the N nearest neighbors) may be the category label that the subject individual most closely resembles (in terms of provisioned rights and/or skill-usage) whether or not the subject individual has that same predominant category label. Additionally, in some cases, the various systems and techniques described herein may be used to determine that a number of individuals with anomalous rights and/or anomalous skill-usage may report to the same individual. This can be flagged for investigation-even where the common supervisor does not themselves have an anomalous rights and/or skill-usage profile.

FIG. 1 is a block diagram illustrating a peer-based unused rights detection system 102, according to various embodiments of the present disclosure. In various examples, one or more computing devices may implement the peer-based unused rights detection system 102. In examples where more than one computing device implements the peer-based unused rights detection system 102, the different computing devices may communicate with one another over a network 104. For example, a remote computing device (and/or remote system of computing devices) may communicate with peer-based unused rights detection system 102 via an application programming interface (API) as a cloud-based service. For example, rights profiles (e.g., rights vectors) of individuals associated with an enterprise may be sent to peer-based unused rights detection system 102 for determination of anomalous rights profiles among the individuals.

In various examples, each of the one or more computing devices used to implement peer-based unused rights detection system 102 may comprise one or more processors. The one or more computing devices used to implement peer-based unused rights detection system 102 may be configured in communication with at least one non-transitory computer readable memory 103 ("memory 103"). In at least some examples, the one or more computing devices used to implement peer-based unused rights detection system 102 may communicate with memory 103 over network 104. The memory 103 may store computer-readable instructions that, when executed by at least one processor of the one or more computing devices implementing peer-based unused rights detection system 102, may be effective to program the one or more processors to perform the various anomalous rights detection techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

The peer-based unused rights detection system 102 depicted in FIG. 1 is able to perform various different techniques. In some cases, the techniques may be combined, as is shown in the example. However, the techniques may also be used separately. For example, the peer-based unused rights detection system 102 shown in FIG. 1 may be effective to detect profiles (e.g., agent profiles) having anomalous rights (e.g., an anomalous rights holder 124), profiles exhibiting anomalous skill-usage data, and may also detect and/or remove unused rights for a given input profile (block 130).

Individuals associated with an institution (such as an employer) may be associated with a respective rights vector 116a that represents the rights of that individual. In the example depicted in FIG. 1, the rights vectors for each individual may be stored in provisioned rights database 114. However, provisioned rights database 114 may be a separate component from the peer-based unused rights detection system 102 in various embodiments. For example, when peer-based unused rights detection system 102 is implemented as a service, the rights vectors 116 and/or skill vectors stored in skill-usage database 132, etc., may be provided by the institution/system using the peer-based unused rights detection system 102 (e.g., over network 104).

In addition to the rights vector 116 a profile representing each individual may be associated with one or more category labels 118. The category labels 118 may describe various categories associated with the individuals. For example, category labels 118 may include job titles, job categories, job families, roles, responsibilities, etc. The specific category labels used may vary according to the desired implementation. Category labels 118 may be stored in provisioned rights database 114 and/or at some other location and may be accessible by peer-based unused rights detection system 102.

As depicted in FIG. 1, peer-based unused rights detection system 102 may execute an N nearest neighbors algorithm in the rights vector space (e.g., a feature space of the rights vector 116) to determine N nearest neighbors 120a. The N nearest neighbors 120a represent the N most similar rights vectors in the rights space. For example, N nearest neighbors 120*a* represents the N most similar rights vectors to rights vector 116 for input profile data. Each of the rights vectors of the N nearest neighbors 120*a* are associated with a particular individual. These individuals are, in turn, associated with category labels (e.g., job titles, job categories, etc.). The nearest neighbor algorithm may be a clustering algorithm and/or any other nearest neighbor algorithm (e.g., K-means clustering, K-nearest neighbors (KNN), etc.).

A P100 score may be determined in the rights space for a subject profile by determining the number of individuals of the N nearest neighbors 120*a* that have the same category label as category label 118. P100 scores (or, more generally, P scores) may be determined for each individual of interest (e.g., for each employee of an institution). The peer-based unused rights detection system 102 may determine a distribution of P100 scores for each individual having the same category label as the subject individual. Note that this may be performed for multiple different category labels. For example, P100 distribution 122*a* may be a distribution of P100 scores for individuals having the same category label as individual 101*a* (e.g., having a category label identical to category label 118*a*). The distribution may be used to determine how statistically anomalous the individual's rights are. For example, Z-score may be determined for each distribution. Individuals with large Z-scores may have anomalous rights with respect to other individuals having the same category label.

In the example of FIG. 1, an anomalous rights holder 124 may be determined to have anomalous rights based on their Z-score and/or P score. Accordingly, this individual may be subject to further analysis to determine any unused rights. A skill-usage vector 126 may be determined for the subject individual determined to have anomalous rights (e.g., anomalous rights holder 124). The skill-usage vector 126 may include an element for each skill associated with the organization. Each element of the skill-usage vector may include either a binary or a non-negative integer value (depending on the desired implementation). In the binary implementation, one value (e.g., a "1") may represent that the individual has used the relevant skill over the past time period of interest, while the other value (e.g., a "0") may represent that the individual has not used the relevant skill over the past time period of interest. In the non-negative integer case, the value for each element may represent the number of times that the individual has invoked the skill over the past time period of interest. Skill-usage database 132 may include data indicating use of each skill along with relevant timestamp information and/or partitioned per time period.

Upon determining a skill-usage vector for the anomalous rights holder 124 (and for all other individuals of interest), peer-based unused rights detection system 102 may execute an N nearest neighbors algorithm in the skill-usage vector space (e.g., a feature space of the skill-usage vector 126) to determine N nearest neighbors 120*b* in the skill-usage vector space over the relevant time period. The N nearest neighbors 120*b* represent the N most similar individuals in terms of skill-usage over the relevant time period to the subject individual (e.g., anomalous rights holder 124). For example, N nearest neighbors 120*b* represents the N most similar skill-usage vectors to skill-usage vector 126 for anomalous rights holder 124. Each of the rights skill-usage vectors of the N nearest neighbors 120*b* are associated with a particular profile. These profiles are, in turn, associated with category labels (e.g., job titles, job categories, etc.).

A P100 score may be determined in the skills space for a subject profile in the same way as described above in the rights space by determining the number of individuals of the N nearest neighbors 120*b* that have the same category label as category label 118.

P100 scores (or, more generally, P scores) may be determined for each individual of interest (e.g., for each employee of an institution) in the skill space for a given category label. The peer-based unused rights detection system 102 may determine a distribution of P100 scores for each individual having the same category label as the subject individual. Note that this may be performed for multiple different category labels. For example, P100 distribution 122*b* may be a distribution of P100 scores for individuals having the same category label as the anomalous rights holder 124 (e.g., having a category label identical to category label 118). The distributions may be used to determine how statistically anomalous the individual's rights are. For example, Z-score may be determined for each distribution. Individuals with large Z-scores may exhibit anomalous skill-usage over the relevant time period with respect to other individuals having the same category label. Various remedial actions and/or alerts may be generated based on anomalous skill-usage (similar to anomalous rights provisioning).

In addition to determining anonymous skill-usage and/or anonymous rights provisioning, peer-based unused rights detection system 102 may be used to detect unused rights of profiles. For example, upon determining the N nearest neighbors 120*b* in the skill-usage vector space, the rights vectors of these N nearest neighbors 120*b* may be determined. The rights vectors of the skill-usage vector nearest neighbors may be compared to the rights vector of the subject (e.g., anomalous rights holder 124) to determine significant difference in the rights vectors 116 (block 128). For example, the rights vectors 116 of the N nearest neighbors 120*b* (e.g., "skill-usage neighbors") can be determined and compared to the subject's rights vector 116. The comparison at block 128 may include normalizing the presence of the skill-usage neighbor's rights between 0 and 1 (0 if none of the n neighbors have the right, 1 if all do) and subtracting from the given employee's rights vector. In various examples, the normalized rights vectors of the skill-usage neighbors may be averaged to determine the average rights vector pertaining to the skill-usage neighbors. The difference between the subject's rights vector 116 and that of their normalized skill-usage neighbors' rights vectors 116 can indicate which rights are most likely not used given the employee and their neighbors are invoking similar sets of skills yet the subject has additional rights (block 130). In various examples, the unused rights may be automatically removed from the input profile data to avoid unnecessary rights provisioning that could lead to potential misuse. Note that P100 scores for rights and/or skills usage may be aggregated for individuals at a group level. For example, all the P100 scores may be aggregated for all individual users at a particular work site (e.g., a building) and/or for a particular city, country, or other geographic locale, and/or for a particular role or responsibility. Even if the various outlier detection techniques used for determining anomalous rights and/or skill usage do not indicate that individuals in the group are anomalous, the P100 scores may be used to draw insights about the particular group. For example, it may be determined that the P100 scores for individuals at a particular site are only 1.5 standard deviations from the mean (where +/−2 standard deviations are required to classify an individual as anomalous). However, the fact that the individuals at the particular site are somewhat anomalous as compared to other sites may be used to draw the insight that some mechanism and/or practice is causing anomalous rights provisioning and/or skill usage at the particular site. Accordingly, the techniques described herein may be used to determine and/or investigate biases in anomalous rights provisioning and/or skill usage at various levels of aggregation.

Figure 2:
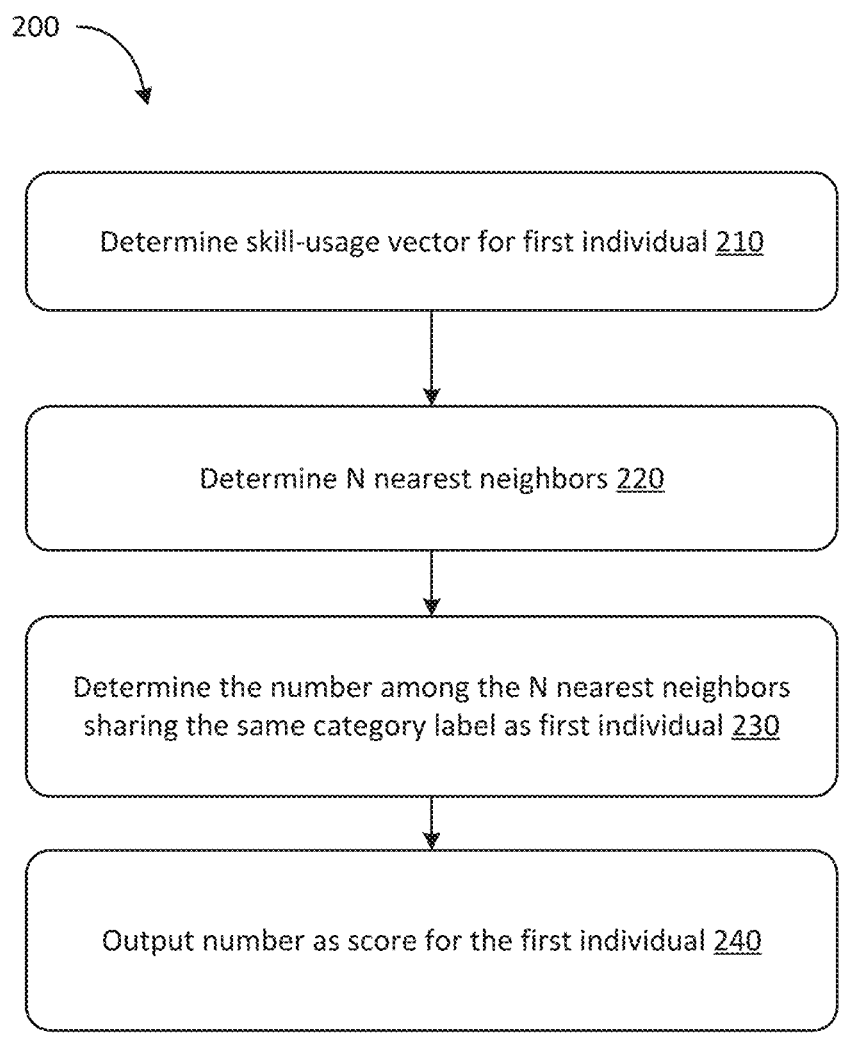
FIG. 2 is a flow diagram illustrating an example process for determining a score that may be used to determine anomalous skill-usage, in accordance with various embodiments of the present disclosure.

FIG. 2 is a flow diagram illustrating an example process 200 for determining a score that may be used to determine anomalous skill-usage, in accordance with various embodiments of the present disclosure. The process 200 of FIG. 2 may be executed by one or more computing devices. The actions of process 200 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 200 may be described above with reference to elements of FIG. 1. Although shown in a particular order, the steps of process 200 may instead be performed in a different order. Additionally, various steps may be performed in parallel in various implementations. Further, some steps may be omitted and/or other steps may be added in accordance with the peer-based anomalous skill-usage detection techniques described herein.

Process 200 may begin at action 210, at which a skill-usage vector for a first individual may be determined. The skill-usage vector may represent skill-usage associated with a particular profile over a time period of interest (e.g., a predefined time period such as a day, week, month, and/or any other desired time period). As described above, each element of the skill-usage vector may correspond to a particular skill. The value of each element may indicate whether the individual has or has not used the respective skill. For example, a value of 0 at a first element may indicate that the individual has not used the relevant skill during the time period of interest (the skill corresponding to the first element), while a value of 1 at the first element may indicate that the individual has used the skill during the time period. In other examples, a value of 0 may indicate that the individual has used the skill, while a value of 1 may indicate that the individual has not used the skill. In addition, non-binary examples are also possible. For example, in an alternate implementation, the value may indicate the number of times that the individual has used the skill.

Process 200 may continue at action 220, at which the N nearest neighbors may be determined for the skill-usage vector determined at action 210. For example, the ANNOY approximate nearest neighbor algorithm (or some other nearest neighbor algorithm) may be used to determine the N nearest neighbors in the skill-usage space that have the most similar skill-usage to the individual. N may take any desired value.

Process 200 may continue at action 230, at which the number among the N nearest neighbors sharing the same category as the first individual may be determined. For example, the first individual may have a category label "Data analyst 3." The N nearest neighbor algorithm may output 100 nearest neighbors (e.g., for N=100). At action 230, the number of the 100 nearest neighbors that also have the category label "Data analyst 3" may be determined.

Process 200 may continue at action 240, at which the number determined at action 230 may be output as a score for the first individual. As described above, the number may be referred to as a P score or, in the case where N=100, a P100 score. In general, the score may represent whether the individuals with the most similar skill-usage to the first individual are of the same category as the first individual.

Figure 3:
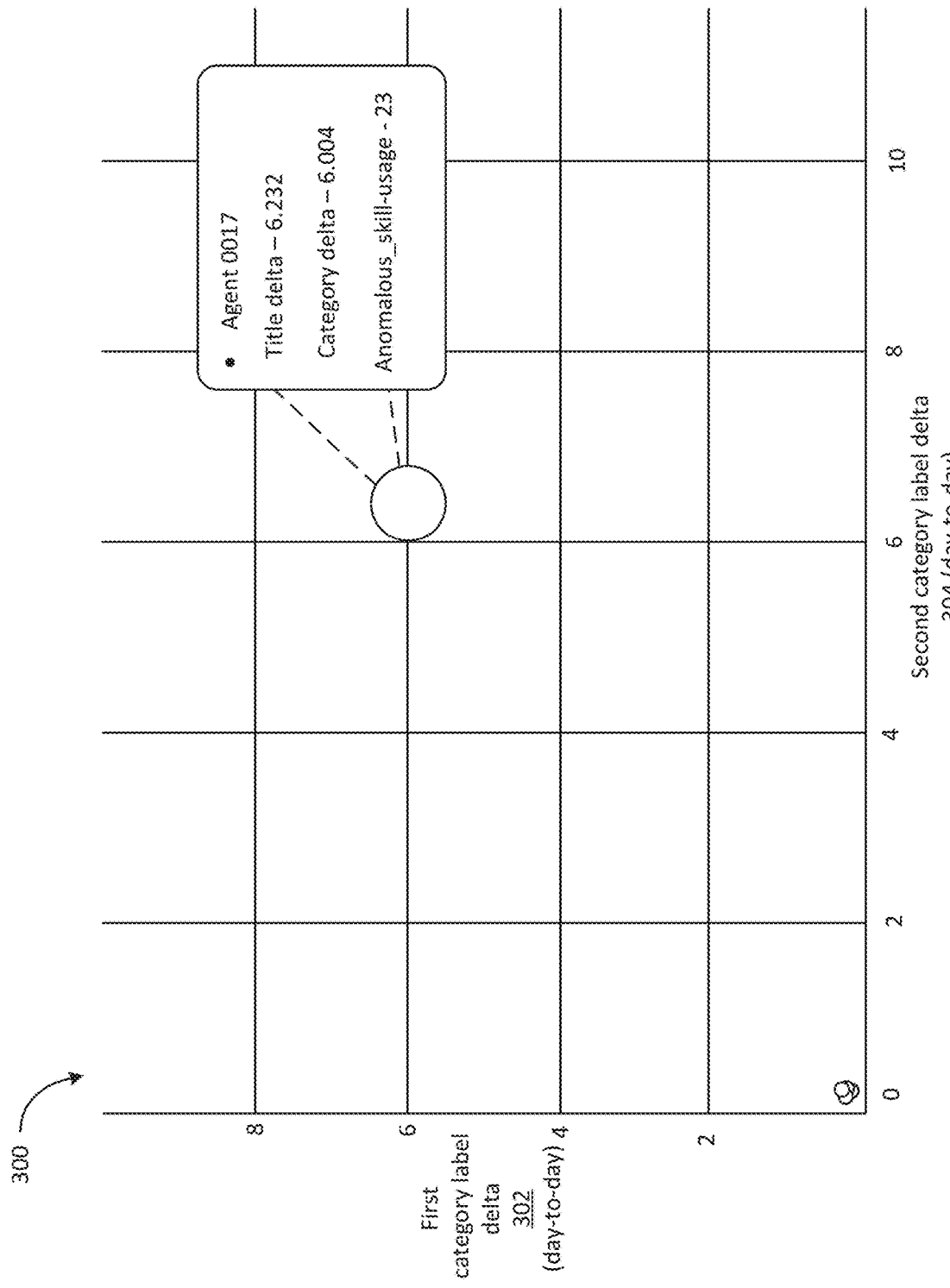
FIG. 3 is an interface depicting an example data visualization of anomalous skill-usage detection, in accordance with various aspects of the present disclosure.

FIG. 3 is an interface depicting an example data visualization 300 of anomalous skill-usage detection, in accordance with various aspects of the present disclosure. In examples where the peer-based unused rights detection system 102 is implemented as a service, data visualization 300 may be provided via a graphical user interface. In the example data visualization 300, the two axes represent the day-to-day change of P100 Z-scores for a first category label delta 302 (Y axis) and a second category label delta 304 (X axis). Each dot may represent an individual and the size of the dot indicates the number of anomalous skills used during this period. The first category label and second category label being referred to in reference to FIG. 3 may be related to any category (e.g., job title, job family, job category, role, etc.). It should be appreciated that the particular data visualization of FIG. 3 is but one possible data visualization that may be used in accordance with the various techniques described herein. However, any suitable data visualization may be used to show anomalous rights and/or provisioning of anomalous rights, according to the desired implementation.

As seen in FIG. 3, the majority of individuals have day-to-day Z-scores grouped near the origin and thus have not seen statistically anomalous skill-usage over the past 24 hour period. However, Agent 0017 has seen a day-over-day delta of P100 Z scores of 6.232 for the title category (e.g., title delta 304) and 6.004 for the category label (e.g., category delta 302), with 23 anomalous skills having been used. In various examples, the representative "segment vector" may be calculated for Agent 0017 to determine the anomalous skills. For example, for each category label (e.g., job family, job title, department, and/or any other desired category descriptor) a representative segment vector of skill-usage may be determined. The segment vector may be a skill-usage vector that takes the average of all values of all individuals having the relevant category label (e.g., an average vector for all rights values for the category label). In the case where the skill-usage vectors are binary, the segment vector will have values between 0-1. Accordingly, the segment vector measures the relative propensity of each category to have used (or not used) each skill. Agent 0017's skill-usage vector may be subtracted from the segment vector and skills with less than a ¹⁄₁₀ chance of appearing given the employee category may be flagged for potential investigation. Accordingly, the segment vector may be used to determine that 23 anomalous skills (or skill-usages) are associated with Agent 0017.

In various examples, Agent 0017 may be flagged for investigation and/or an alert (e.g., alert data) may be generated indicating that Agent 0017 has been exhibited anomalous skill-usage within the last relevant time period (24 hours in the example of FIG. 3). For example, the alert data may indicate a number of anomalous skills used by a particular individual. In some other examples, the alert data may indicate the segment vector for individuals having the same category label as the individual (e.g., to show what a typical individual's rights profile from the same category looks like). In some further examples, the alert data may show the top N most similar individuals (and/or their category labels) to the individual in terms of those individuals with the most similar skill-usage profiles/vectors. The alert data may be generated based on an anomalous Z score (e.g., greater than 20 or any other desired value), based on the number of anomalous skills being used being above a given threshold, etc. The particular metric used to determine whether an alert should be generated may be varied according to the desired implementation.

Additionally, as previously described, a representative rights vector may be determined only for the N nearest neighbors to a subject individual in the skills space. Thereafter the representative rights vector (e.g., a segment vector) may be subtracted from the subject individual's rights vector to detect unused rights, as previously described.

Figure 4:
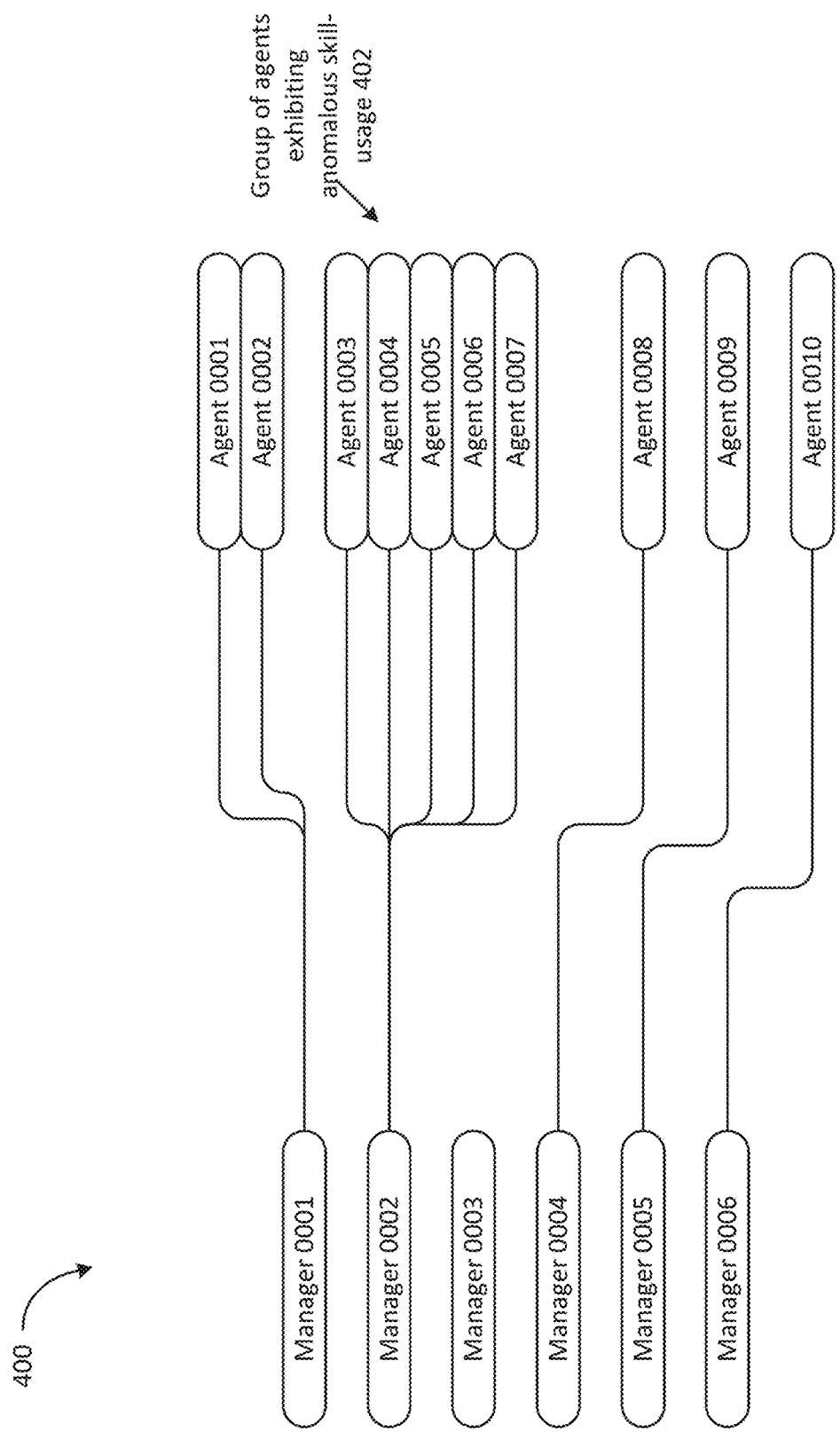
FIG. 4 is another interface depicting another example data visualization of a peer-based anomalous skill-usage detection, in accordance with various aspects of the present disclosure.

FIG. 4 is another data visualization 400 depicting another example data visualization of a peer-based anomalous skill-usage detection, in accordance with various aspects of the present disclosure. In examples where the peer-based unused rights detection system 102 is implemented as a service, data visualization 400 may be provided via a graphical user interface. In various examples, after determining that one or more individuals have exhibited anomalous skill-usage (e.g., based on Z-scores and/or changes in Z-scores exceeding a desired threshold), data visualizations may be provided to show hierarchical report chains. Such hierarchical visualizations may show that many individuals exhibiting anomalous skill-usage report directly to the same individual. For example, in FIG. 4, the Agents 0001-0010 may have been determined to exhibit anomalous skill-usage over the relevant time period. As can be seen, Agents 0003-0007 (e.g., group of agents exhibiting anomalous skill-usage 402) all report to the same Manager 0002. Accordingly, while Manager 0002 may not themselves exhibit anomalous skill-usage, Manager 0002 may be flagged for investigation based on possible provisioning of anomalous rights to their direct reports (enabling the anomalous skill-usage 402).

In some cases, it could be that an individual's provisioned rights and/or skill-usage is not anomalous; however, the amount and/or rate at which the individual is using one or more skills may be anomalous. For example, a user generate automating code in a browser to use a skill over and over again to gain large scale user data (e.g., for exfiltration). Such skill usage may be anomalous in terms of the amount of times the skill was used over a given time period, even when the skill itself is customarily used during practices of other individuals having the same category label 118 as the subject individual. Accordingly, in such examples, a non-binary skill usage vector may be advantageous to reflect anomalies in the amount of skill usage in a given time period.

Figure 5:
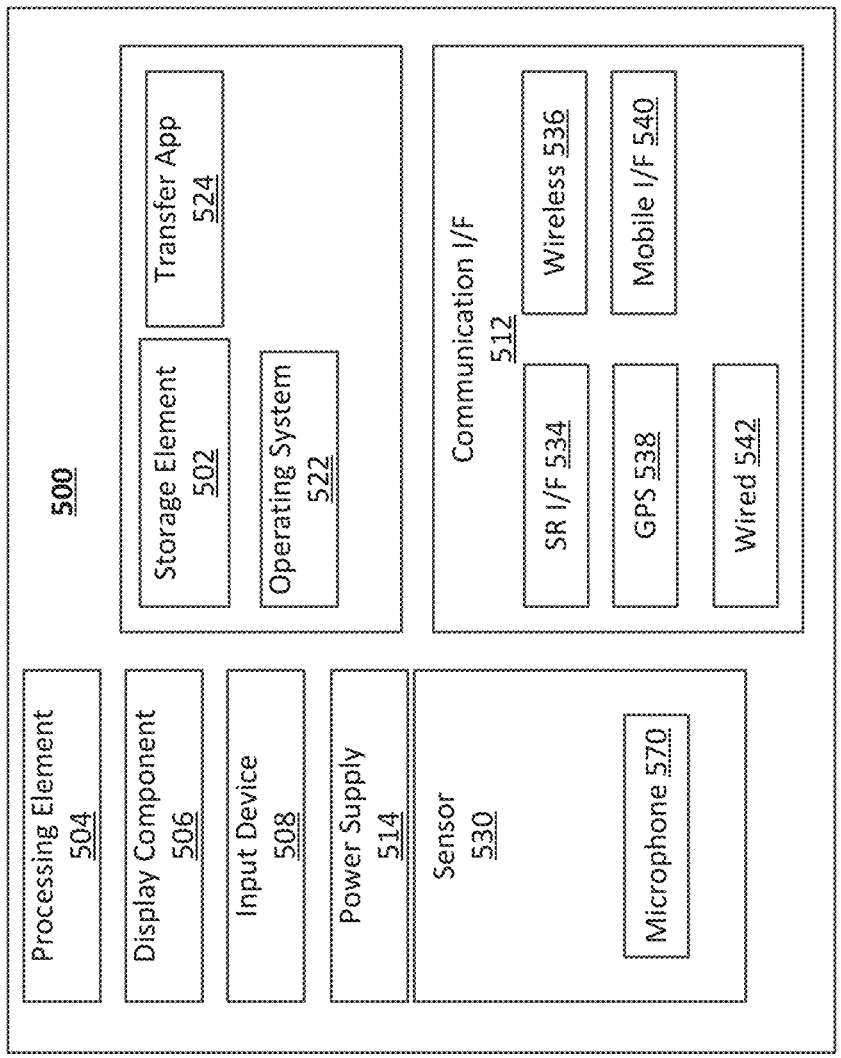
FIG. 5 is a block diagram showing an example architecture of a computing device that may be used in accordance with various embodiments described herein.

FIG. 5 is a block diagram showing an example architecture 500 of a computing device that may be used to implement, at least in part, a peer-based unused rights detection system 102, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
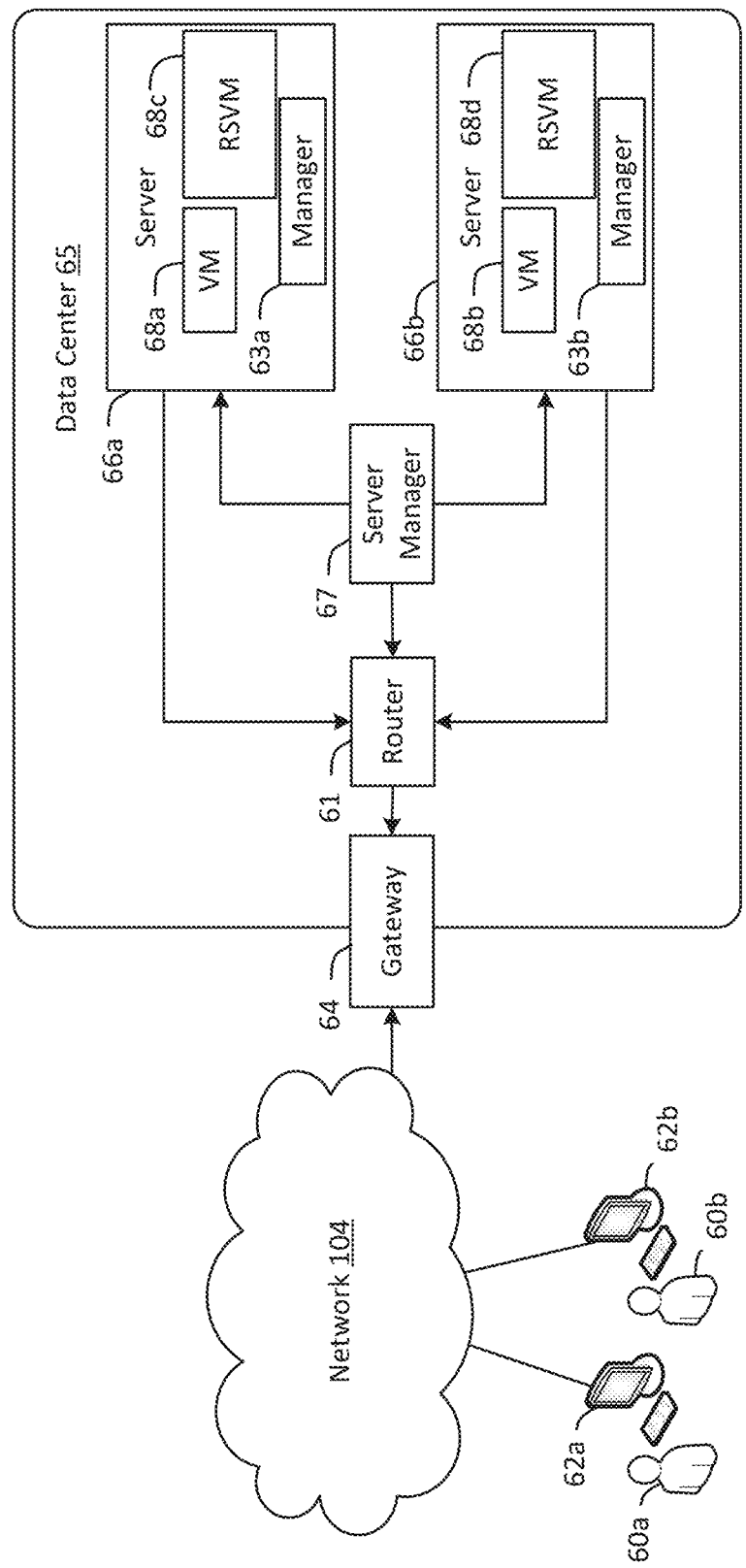
FIG. 6 is a diagram illustrating an example system for sending and providing data that may be used in accordance with the present disclosure.

An example system for implementing a peer-based unused rights detection system will now be described in detail. In particular, FIG. 6 illustrates an example computing environment in which the embodiments described herein may be implemented. For example, the computing environment of FIG. 6 may be configured to provide peer-based anomalous rights detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources-consisting of many processors, large amounts of memory and/or large storage capacity—and small resources-consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances. In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
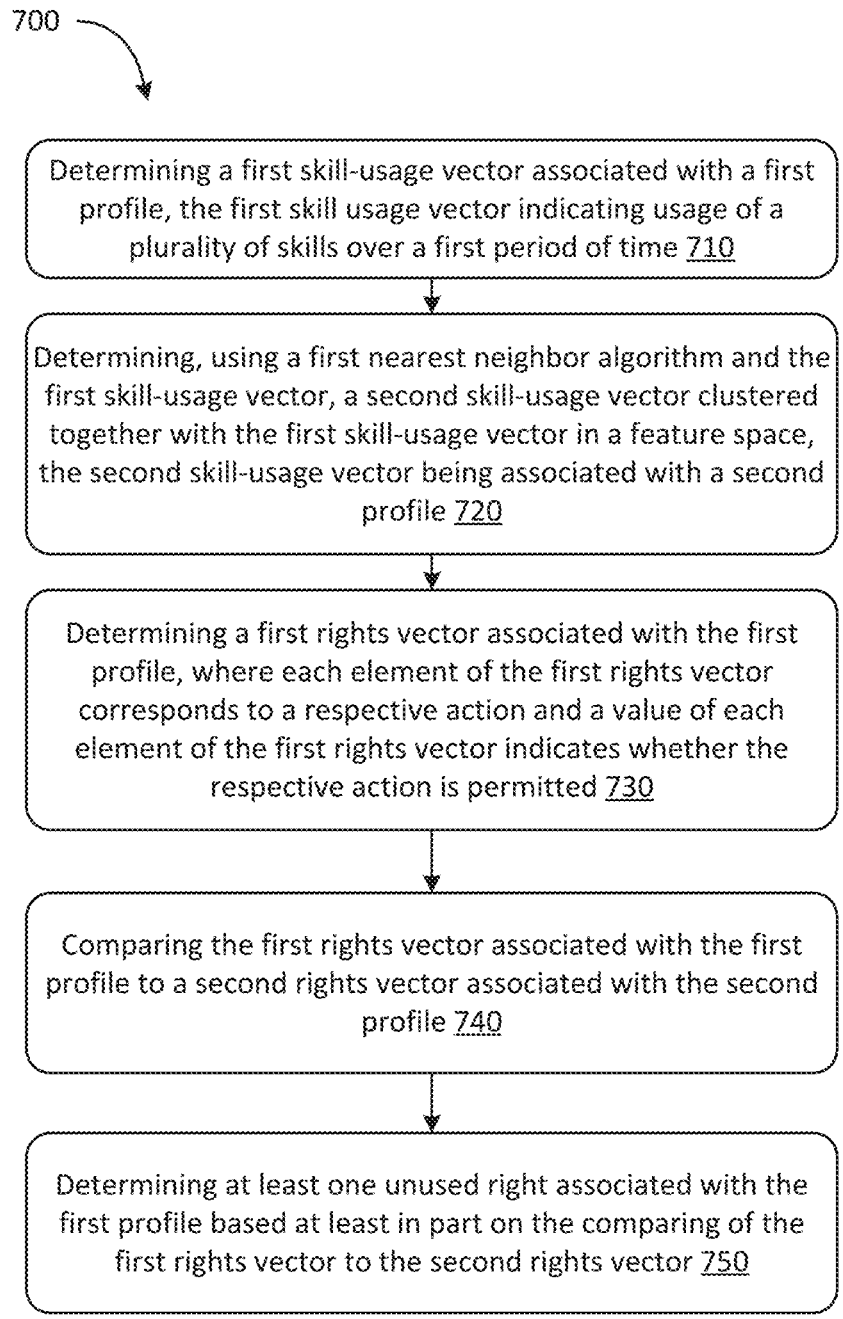
FIG. 7 is a flow diagram illustrating an example process for determining unused rights, according to various techniques described herein.

FIG. 7 is a flow diagram illustrating an example process 700 for determining unused rights, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the peer-based anomalous rights detection techniques described herein.

Process 700 may begin at action 710, at which a first skill-usage vector associated with a first profile may be determined. The first skill-usage vector may indicate usage of a plurality of skills over a first period of time. Each element of the first skill-usage vector may be associated with a respective skill of the list of all relevant skills. The value of each element of the skill usage vector may represent whether or not the profile is associated with use of the relevant skill over the first period of time or whether the profile has not used the relevant skill during the first period of time. In another example implementation, value of each element of the skill-usage vector may represent the number of times the skill was used over the first period of time and/or the amount of time the skill was used over the first period of time.

Processing may continue at action 720, at which, a first nearest neighbor algorithm may be used to determine the most similar skill-usage vectors to the first skill-usage vector. For example, the first skill-usage vector may be grouped together with various other skill-usage vectors that are most similar to the first skill-usage vector (e.g., based on a distance metric such as Euclidean distance or cosine distance (cosine similarity)) in the vector space. Cosine similarity may be used when the skill-usage vectors include binary values, while Euclidean distance may be used when the skill-usage vectors include positive numbers. The second skill-usage vector may be included in the same group (e.g., cluster) with the first skill-usage vector indicating a high degree of similarity between the two vectors. The second skill-usage vector may be associated with a second profile different from the first profile.

Processing may continue at action 730, at which a first rights vector associated with the first profile may be determined. Each element of the first rights vector may correspond to a respective action (e.g., access to a particular database, ability to access personally-identifiable information, etc.), and a value for each element of the first rights vector may indicate whether the respective action is permitted (e.g., a "1" may indicate that the action is permitted while a "0" may indicate that the action is impermissible).

Processing may continue to action 740, at which the first rights vector associated with the first profile may be compared to a second rights vector associated with the second profile. In various examples, the rights vectors of the N nearest neighbors in the skill-usage space may be normalized (e.g., averaged). As mentioned above, the second profile may be associated with a skill-usage vector that is among the N nearest neighbors in the skill-usage space (to the first skill-usage vector of the first profile). The normalized rights vector representing the rights of the N nearest skill neighbors may be compared to the first rights vector associated with the first profile. For example, the normalized rights vector representing the rights of the N nearest skill neighbors may be subtracted from the first rights vector.

Processing may continue to action 750, at which at least one unused right associated with the first profile may be determined based at least in part on the comparing of the first rights vector to the second rights vector. For example, after subtracting the normalized rights vector representing the rights of the N nearest skill neighbors from the first rights vector, high values in the resulting vector (e.g., values at or close to "1" and/or above a threshold value) may indicate rights that are unused by the first profile. In various examples, such unused rights may generate an alert, may flag the profile for follow-up, and/or the unused rights may be de-provisioned from the first profile. In some cases, it may be beneficial to remove such rights to eliminate security and/or privacy risks since the first profile is not using the rights as part of their typical workflow (as evidenced by the most similar skill-usage profiles not having these rights). In some cases, if the data indicate with high precision that skill-usage and/or rights provisioning is anomalous, the workflow of the subject individual may be interrupted using a remote control (e.g., a "kill switch") to lock the individual out of the workflow until an investigator can assess the situation.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of unused rights detection, the method comprising:
   receiving a first rights vector representing a plurality of rights associated with a first user profile, wherein each right of the plurality of rights is associated with a respective permitted action, wherein each element of the first rights vector corresponds to a respective permissive action, wherein a respective value of each element of the first rights vector indicates whether the respective permissive action is permissible for the first user profile;
   generating a first skill-usage vector representing skill-usage associated with the first user profile over a first period of time, the first skill-usage vector indicating at least one of whether and a respective number of times each skill of a plurality of skills was used in connection with the first user profile over the first period of time;
   determining, using a first approximate nearest neighbor algorithm, a second user profile associated with a second skill-usage vector representing skill-usage associated with the second user profile over the first period of time, wherein the second skill-usage vector is determined by the first approximate nearest neighbor algorithm to be similar to the first skill-usage vector using a distance metric;
   determining a second rights vector associated with the second user profile;
   comparing the first rights vector to the second rights vector;
   determining, based on the comparing the first rights vector to the second rights vector, a first right associated with the first user profile that is not associated with the second user profile; and
   generating a modified first rights vector by removing the first right from the first rights vector; and
   storing the modified first rights vector in non-transitory computer-readable memory in association with the first user profile.

2. The computer-implemented method of claim 1, further comprising:
   determining a category label representing a category of the first user profile;
   determining, using the first approximate nearest neighbor algorithm, a set of user profiles having respective skill-usage vectors that are similar to the first skill-usage vector; and
   determining a first score for the first user profile, the first score being a number of other user profiles among the set of user profiles having the category label.

3. The computer-implemented method of claim 1, wherein:
   each skill of the plurality of skills represents a computer-implemented action; and
   usage of at least some of the skills of the plurality of skills is enabled at least in part by having at least one of the plurality of rights.

4. A method comprising:
   determining a first skill-usage vector associated with a first profile, the first skill-usage vector indicating usage of a plurality of skills over a first period of time, wherein the first skill-usage vector represents a respective number of times each of the plurality of skills has been used over the first period of time;
determining, using a first nearest neighbor algorithm and the first skill-usage vector, a second skill-usage vector grouped together with the first skill-usage vector in a feature space, wherein the second skill-usage vector is associated with a second profile;
determining a first rights vector associated with the first profile, wherein each element of the first rights vector corresponds to a respective permissive action, wherein a respective value of each element of the first rights vector indicates whether the respective permissive action is permissible for the first profile;
comparing the first rights vector associated with the first profile to a second rights vector associated with the second profile;
determining at least one unused right associated with the first profile based at least in part on the comparing of the first rights vector to the second rights vector; and
generating a modified first rights vector by removing the at least one unused right from the first rights vector.

5. The method of claim 4, further comprising:
determining a category label associated with the first profile; and
determining a number of profiles having the category label that are associated with respective skill-usage vectors grouped together with the first skill-usage vector in the feature space by the first nearest neighbor algorithm.

6. The method of claim 5, further comprising determining a standard deviation of the number with respect to a mean value of the number for other profiles having the category label.

7. The method of claim 6, further comprising determining that skill-usage by the first profile over the first period of time is anomalous with respect to other profiles having the category label based at least in part on the standard deviation.

8. The method of claim 4, wherein each element of the first skill-usage vector corresponds to a respective skill, and wherein a value of each element of the first skill-usage vector indicates whether the respective skill was used during the first period of time, wherein each respective skill requires at least one right to enable performance of the respective skill by a user.

9. The method of claim 8, further comprising determining a cosine distance between the first skill-usage vector and the second skill-usage vector.

10. The method of claim 4, further comprising:
determining, using a second approximate nearest neighbor algorithm, a set of profiles having similar rights vectors to the first rights vector;
determining a category label representing a category of the first profile;
determining a first score for the first profile, the first score being a number of other profiles among the set of profiles having the category label;
determining a mean score for other profiles having the category label;
determining a residual value for the first profile, the residual value being a difference between the mean score and the first score; and
determining that the first profile is associated with anomalous rights based on the residual value.

11. The method of claim 10, further comprising determining the first skill-usage vector associated with the first profile based at least in part on the first profile being associated with anomalous rights.

12. The method of claim 4, further comprising:
storing the modified first rights vector in non-transitory computer-readable memory in association with the first profile.

13. A system comprising:
at least one processor; and
non-transitory computer-readable memory storing instructions that, when executed by the at least one processor, are effective to:
determine a first skill-usage vector associated with a first profile, the first skill-usage vector indicating usage of a plurality of skills over a first period of time, wherein the first skill-usage vector represents a respective number of times each of the plurality of skills has been used over the first period of time;
determine, using a first nearest neighbor algorithm and the first skill-usage vector, a second skill-usage vector clustered together with the first skill-usage vector in a feature space, wherein the second skill-usage vector is associated with a second profile;
determine a first rights vector associated with the first profile, wherein each element of the first rights vector corresponds to a respective permissive action, wherein a respective value of each element of the first rights vector indicates whether the respective permissive action is permissible for the first profile;
compare the first rights vector associated with the first profile to a second rights vector associated with the second profile;
determine at least one unused right associated with the first profile based at least in part on the comparing of the first rights vector to the second rights vector; and
generating a modified first rights vector by removing the at least one unused right from the first rights vector.

14. The system of claim 13, the non-transitory computer-readable memory storing further instructions that, when executed by the at least one processor, are further effective to:
determine a category label associated with the first profile; and
determine a number of profiles having the category label that are associated with respective skill-usage vectors grouped together with the first skill-usage vector in the feature space by the first nearest neighbor algorithm.

15. The system of claim 14, the non-transitory computer-readable memory storing further instructions that, when executed by the at least one processor, are further effective to determine a standard deviation of the number with respect to a mean value of the number for other profiles having the category label.

16. The system of claim 15, the non-transitory computer-readable memory storing further instructions that, when executed by the at least one processor, are further effective to:
determine that skill-usage by the first profile over the first period of time is anomalous with respect to other profiles having the category label based at least in part on the standard deviation.

17. The system of claim 13, wherein each element of the first skill-usage vector corresponds to a respective skill, and wherein a value of each element of the first skill-usage vector indicates whether the respective skill was used during the first period of time, wherein each respective skill requires at least one right to enable performance of the respective skill by a user.

18. The system of claim 13, the non-transitory computer-readable memory storing further instructions that, when executed by the at least one processor, are further effective to determine a cosine distance between the first skill-usage vector and the second skill-usage vector.

19. The system of claim 13, the non-transitory computer-readable memory storing further instructions that, when executed by the at least one processor, are further effective to:

determine, using a second approximate nearest neighbor algorithm, a set of profiles having similar rights vectors to the first rights vector;

determine a category label representing a category of the first profile;

determine a first score for the first profile, the first score being a number of other profiles among the set of profiles having the category label;

determine a mean score for other profiles having the category label;

determine a residual value for the first profile, the residual value being a difference between the mean score and the first score; and determine that the first profile is associated with anomalous rights based on the residual value.

20. The system of claim 13, the non-transitory computer-readable memory storing further instructions that, when executed by the at least one processor, are further effective to:

store the modified first rights vector in non-transitory computer-readable memory in association with the first profile.

* * * * *